United States Patent
Nozu et al.

(10) Patent No.: US 8,538,650 B2
(45) Date of Patent: Sep. 17, 2013

(54) DRIVING FORCE DISTRIBUTION CONTROL DEVICE AND FOUR-WHEEL-DRIVE VEHICLE

(75) Inventors: Tomohiro Nozu, Anjo (JP); Ryohei Shigeta, Anjo (JP); Akira Kodama, Chiryu (JP); Go Nagayama, Toyama (JP); Yasushi Yagi, Hiroshima (JP); Daisuke Kofu, Hiroshima (JP); Akihiro Tatara, Hiroshima (JP)

(73) Assignee: JTEKT Corporation, Osaka-shi (JP)

(*) Notice: Subject to any disclaimer, the term of this patent is extended or adjusted under 35 U.S.C. 154(b) by 0 days.

(21) Appl. No.: 13/564,329

(22) Filed: Aug. 1, 2012

(65) Prior Publication Data
US 2013/0035833 A1 Feb. 7, 2013

(30) Foreign Application Priority Data
Aug. 1, 2011 (JP) ................................. 2011-168200

(51) Int. Cl.
*G06F 7/00* (2006.01)
(52) U.S. Cl.
USPC ......................................................... 701/69
(58) Field of Classification Search
USPC ......................................................... 701/69
See application file for complete search history.

(56) References Cited

U.S. PATENT DOCUMENTS

| 5,803,197 A | 9/1998 | Hara et al. |
|---|---|---|
| 6,823,252 B2 | 11/2004 | Ito et al. |

FOREIGN PATENT DOCUMENTS

| EP | 1 375 231 A2 | 1/2004 |
|---|---|---|
| EP | 1 375 231 A3 | 1/2004 |
| JP | 2004-17885 | 1/2004 |

OTHER PUBLICATIONS

Extended European Search Report issued Dec. 4, 2012, in Application No. 12178803.8.
U.S. Appl. No. 13/564,311, filed Aug. 1, 2012, Nozu, et al.
U.S. Appl. No. 13/564,280, filed Aug. 1, 2012, Nozu, et al.

*Primary Examiner* — Mary Cheung
*Assistant Examiner* — Anne Mazzara
(74) *Attorney, Agent, or Firm* — Oblon, Spivak, McClelland, Maier & Neustadt, L.L.P.

(57) ABSTRACT

A driving force distribution control device mounted on a vehicle including an engine, a transmission device, a clutch engaging an output shaft of the engine with an input shaft of the transmission device, and a driving force transmission system capable of transmitting output of the transmission device to main and auxiliary drive wheels, includes: a control device obtaining a torque value to be transmitted to the auxiliary drive wheels, the control device reducing the torque value for a predetermined time when the vehicle is in a stopped state or in a state where a vehicle speed of the vehicle is lower than a predetermined value, and an increasing speed of engaging force of the clutch is equal to or greater than a predetermined value; and a driving force transmitting device transmitting torque depending on the obtained torque value to the auxiliary drive wheels.

8 Claims, 5 Drawing Sheets

DRIVING FORCE DISTRIBUTION CONTROL DEVICE AND FOUR-WHEEL-DRIVE VEHICLE

BACKGROUND OF THE INVENTION

The present invention relates to a driving force distribution control device capable of controlling transmission torque to an auxiliary drive wheel and a four-wheel-drive vehicle including the driving force distribution control device.

In the related art, there has been a front-rear wheel drive vehicle which always transmits driving force of an engine to a front wheel serving as a main drive wheel, and transmits the driving force to a rear wheel serving as an auxiliary drive wheel depending on a running state of the vehicle when required (for example, Patent Document 1).

The front-rear wheel drive vehicle disclosed in Patent Document 1 includes a driving force transmitting device which transmits the driving force output from the engine to the auxiliary drive wheel, and has a control function of reducing torque transmitted to the auxiliary drive wheel, compared to that of the normal time, at the time of a sudden start in which a clutch is rapidly connected in the state that the number of revolutions of the engine is increased. Specifically, when the vehicle speed is less than a threshold value and the number of revolutions of the engine is greater than a threshold value, the torque transmitted to the auxiliary drive wheel is reduced for a predetermined time. As a result, an occurrence of torque shock is suppressed when the front-rear wheel driving state is formed at the time of the sudden start.

(Patent Document 1) JP-A-2004-17885

However, according to the above-described control, for example, when, in the stopped state of the vehicle, the number of revolutions of the engine is increased, and thereafter, the accelerator pedal is released within the above predetermined time and the number of revolutions of the engine is lowered, then the vehicle starts, the torque transmitted to the auxiliary drive wheel is reduced. As a result, for example, in a case that the road is a low μ road in which a frictional coefficient of a road surface is low, the main drive wheel (the front wheel) slips at the time of start. Thus, it is considered that, in order to accurately detect the sudden start in the state that the number of revolutions of the engine is increased, a change rate of the number of revolutions of the engine is monitored, when the number of revolutions of the engine is rapidly reduced, it is determined that an operation of rapidly connecting the clutch is performed, and the torque transmitted to the auxiliary drive wheel is reduced for a predetermined time after the determination.

However, even though the above-described control is executed, when the frictional coefficient of the road surface is low, and when the engine torque is excessive, the front and rear wheels slip at the time of the sudden start, the number of revolutions of the engine is not rapidly reduced, and the determination of the sudden start is not accurately performed.

Particularly, in the vehicles of recent years, since a torque capacity of a driving force transmitting member (a propeller shaft, a differential device, a drive shaft or the like) of a driving force transmission system for transmitting torque to the auxiliary drive wheel has been set to be low in view of the lightweight. Since the above components are downsized, it has been required to reliably avoid rapid transmission of high torque to the auxiliary drive wheel.

SUMMARY

This invention provides a driving force distribution control device and a four-wheel-drive vehicle capable of more suitably detecting the sudden start state of the vehicle.

An aspect of the invention provides a driving force distribution control device which is mounted on a four-wheel-drive vehicle including an engine configured to generate driving force for the vehicle, a transmission device configured to shift rotation of an output shaft of the engine, a clutch configured to engage the output shaft of the engine with an input shaft of the transmission device, and a driving force transmission system capable of transmitting output of the transmission device to main drive wheels which are one of front wheels and rear wheels and auxiliary drive wheels which are the other of the front wheels and the rear wheels, the driving force distribution control device comprising: a control device configured to obtain a torque value to be transmitted to the auxiliary drive wheels, the control device configured to reduce the torque value for a predetermined time when the vehicle is in a stopped state or in a state where a vehicle speed of the vehicle is lower than a predetermined value, and an increasing speed of engaging force of the clutch is equal to or greater than a predetermined value; and a driving force transmitting device configured to transmit torque depending on the torque value obtained by the control device to the auxiliary drive wheels.

The control device may reduce the torque value for the predetermined time when the vehicle is in the stopped state or in the state where the vehicle speed of the vehicle is lower than the predetermined value, the increasing speed of the engaging force of the clutch is equal to or greater than the predetermined value, and a rotational speed of the output shaft of the engine is equal to or greater than a predetermined value.

The control device may determine that the increasing speed of the engaging force of the clutch is equal to or greater than the predetermined value when a time when a position of a clutch pedal is moved from a first position to a second position in which the engaging force of the clutch is greater than that in the first position is equal to or less than a predetermined value.

The control device may increase an amount of reduction for reducing the torque value depending on decrease in an outside temperature.

The control device may increase an amount of reduction for reducing the torque value when a traveling direction of the vehicle has an upward gradient.

An aspect of the invention provides a four-wheel-drive vehicle comprising: an engine configured to generate driving force for the vehicle; a transmission device configured to shift rotation of an output shaft of the engine; a clutch configured to engage the output shaft of the engine with an input shaft of the transmission device; a driving force transmission system capable of transmitting the output of the transmission device to main drive wheels which are one of front wheels and rear wheels and auxiliary drive wheels which are the other of the front wheels and the rear wheels; a control device configured to obtain a torque value to be transmitted to the auxiliary drive wheels, the control device configured to reduce the torque value for a predetermined time when the vehicle is in a stopped state or in a state where a vehicle speed of the vehicle is lower than a predetermined value, and an increasing speed of engaging force of the clutch is equal to or greater than a predetermined value; and a driving force transmitting device configured to transmit torque depending on the torque value obtained by the control device to the auxiliary drive wheels.

BRIEF DESCRIPTION OF THE DRAWINGS

FIGS. 2A and 2B illustrate configuration examples of a clutch pedal position sensor for detecting a position of a clutch pedal.

DETAILED DESCRIPTION OF EMBODIMENTS

First Embodiment

Figure 1:
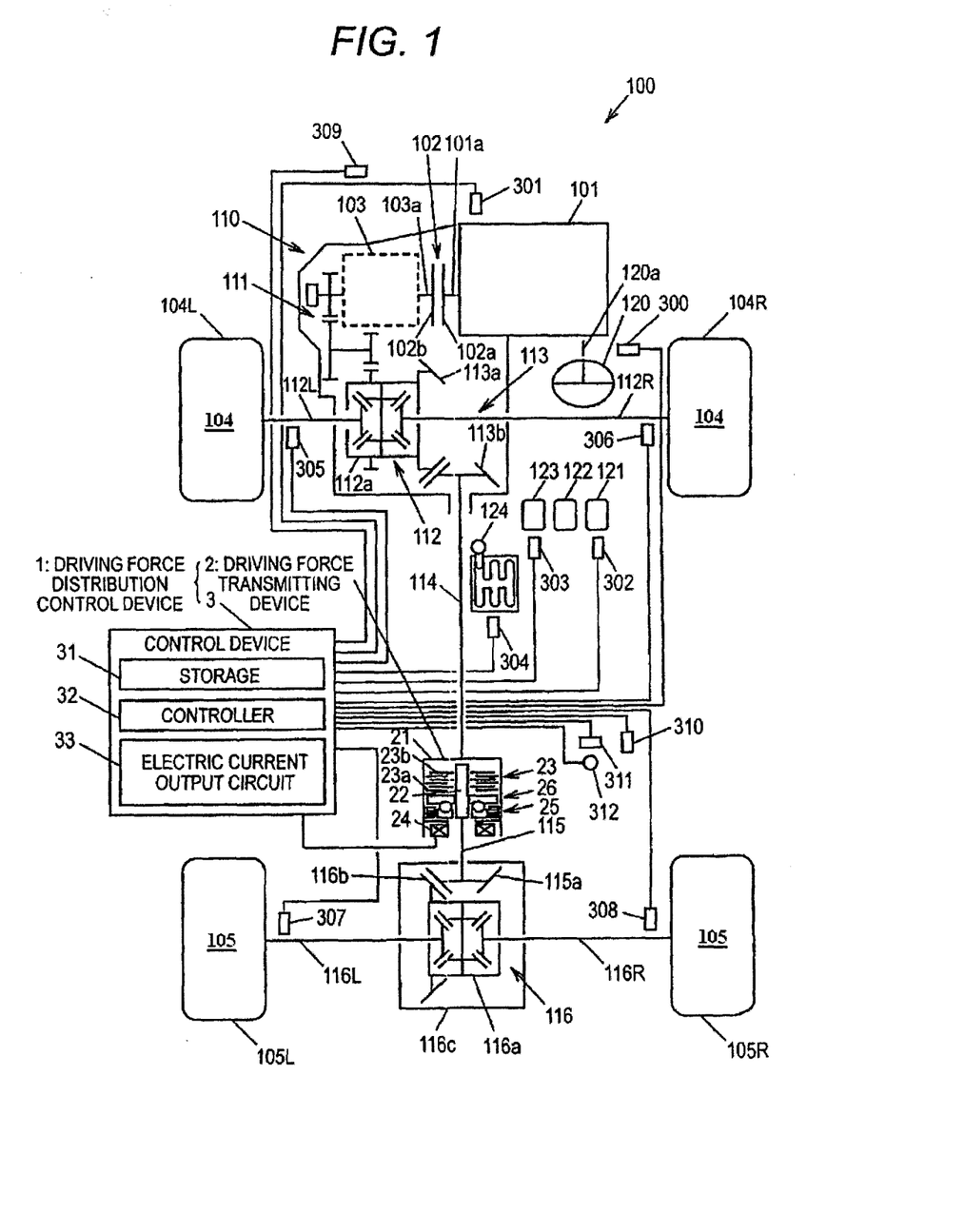
FIG. 1 is a schematic diagram that illustrates a configuration example of a four-wheel-drive vehicle according to a first embodiment of the present invention.

FIG. 1 is a schematic diagram that illustrates a configuration example of a four-wheel-drive vehicle according to a first embodiment of the present invention. As shown in FIG. 1, a four-wheel-drive vehicle 100 is equipped with an engine 101 as a driving source, a transmission 103 as a gearbox that changes output of the engine 101, a clutch 102 which engages an output shaft 101a of the engine 101 and an input shaft 103a of the transmission 103 with each other, a driving force transmission system 110 which transmits output of the transmission 103 to left and right front wheels 104 (a left front wheel 104L and a right front wheel 104R) and left and right rear wheels 105 (a left rear wheel 105L and a right rear wheel 105R) so as to be switchable into a two-wheel-drive state and a four-wheel-drive state, and a driving force distribution control device 1. The driving force distribution control device 1 includes a driving force transmitting device 2 capable of adjusting transmission torque, and a control device 3 that controls the driving force transmitting device 2. The driving force transmitting device 2 is able to switch the running state of the four-wheel-drive vehicle 100 into the two-wheel drive state and the four-wheel-drive state.

Furthermore, in a vehicle interior of the four-wheel-drive vehicle 100, a steering wheel 120, an accelerator pedal 121, a brake pedal 122, a clutch pedal 123, and a shift lever 124, with which the driver operates the vehicle, are provided.

The engine 101 is an internal combustion engine which is supplied with fuel depending on an amount of depression of the accelerator pedal 121, and outputs driving force for causing the four-wheel-drive vehicle 100 to run, from the output shaft 101a connected to the clutch shaft.

The clutch 102 is, for example, a dry type clutch that transmits torque by frictional pressure-contact of a pair of rotation members. The clutch 102 includes a first disk 102a connected to the output shaft 101a of the engine and a second disk 102b connected to the input shaft 103a of the transmission 103. The first disk 102a and the second disk 102b come into pressure-contact with each other by a pressing mechanism (not shown) generating pressure depending on the amount of depression of the clutch pedal 123 by the driver, whereby the first disk 102a and the second disk 102b are frictionally engaged with each other, and the clutch 102 engages the output shaft 101a of the engine 101 with the input shaft 103 of the transmission 103 with each other.

When the driver depresses the clutch pedal 123, the first disk 102a is separated from the second disk 102b, and the torque transmission using the clutch 102 is cut off. Furthermore, when the amount of depression of the clutch pedal 123 is reduced, pressing force of bringing the first disk 102a and the second disk 102b into pressure-contact with each other is increased, and the first and second disks 102a and 102b are frictionally slid, and thus engaging force of the clutch 102 is increased. Along with this, torque transmitted from the engine 101 to the transmission 103 is increased.

The transmission 103 is a manual transmission capable of changing the gear ratio into a plurality of stages by the gear shaft operation of the driver using the shift lever 124. The transmission 103 is, for example, a five-speed transmission capable of changing the gear ratio into five stages (during advancement) from the first speed to the five speed. Furthermore, the transmission 103 is capable of forming a neutral state which does not transmit the driving force of the engine 101 to the driving force transmission system 110.

(Configuration of Driving Force Transmission System)

The driving force transmission system 110 includes a front differential device 112 which distributes torque to the left front wheel 104L and the right front wheel 104R, a gear mechanism 111 which transmits torque of the output shaft of the transmission 103 to a differential case 112a of the front differential device 112, a transfer 113 which includes an input gear 113a connected to the differential case 112a and an output gear 113b having a rotational axis perpendicular to the input gear 113a and meshed with the input gear 113a, a propeller shaft 114 connected to the output gear 113b, a driving force transmitting device 2, a pinion gear shaft 115 to which torque of the propeller shaft 114 is transmitted via the driving force transmitting device 2, and a rear differential device 116 which distributes torque transmitted to the pinion gear shaft 115 into the left rear wheel 105L and the right rear wheel 105R.

Furthermore, the driving force transmission system 110 includes drive shafts 112L and 112R respectably connected to a pair of side gears of the front differential device 112, and drive shafts 116L and 116R respectively connected to a pair of side gears of the rear differential device 116. The drive shafts 112L and 112R transmit torque to the left front wheel 104L and the right front wheel 104R, and the drive shafts 116L and 116R transmit torque to the left rear wheel 105L and the right rear wheel 105R.

A ring gear 116b is provided on an outer peripheral portion of the differential case 116a of the rear differential device 116 in a relatively non-rotatable manner. The ring gear 116b is meshed with the gear part 115a of the pinion gear shaft 115 and transmits torque from the pinion gear shaft 115 to the differential case 116a.

Among the respective components of the driving force transmission system 110, the transfer 113, the propeller shaft 114, the pinion gear shaft 115, the rear differential device 116, and the drive shafts 116L and 116R are an example of a driving force transmitting member that transmits driving force of the engine 101 to the rear wheels 105.

In the driving force transmission system 110, torque output from the transmission 103 is always transmitted to the left front wheel 104L and the right front wheel 104R by such a configuration. Furthermore, torque is transmitted to the left rear wheel 105L and the right rear wheel 105R by the operation of the driving force transmitting device 2 depending on the running state of the four-wheel-drive vehicle 100 when required. That is, in the four-wheel-drive vehicle 100 of the present embodiment, the left front wheel 104L and the right front wheel 104R are main drive wheels and the left rear wheel 105L and the right rear wheel 105R are auxiliary drive wheels.

(Configuration of Control Device)

The control device 3 constituting the driving force distribution control device 1 includes a storage 31 constituted by a ROM, a RAM or the like, a controller 32 constituted by a calculation processing device such as a CPU, and an electric current output circuit 33 controlled by the controller 32. The controller 32 is operated based on program stored in the storage 31, and thus, the control device 3 obtains a value of command torque to be transmitted to the rear wheels 105 using the calculation, based on a rotation difference between the front wheels 104 and the rear wheels 105 of the four-wheel-drive vehicle 100, an amount of acceleration operation of the driver, and the like.

The electric current output circuit 33 supplies electric current depending on the command torque obtained by the calculation processing of the controller 32 to the driving force transmitting device 2. The electric current output circuit 33 is, for example, an inverter circuit that outputs electric current to be supplied from a battery (not shown) by adjusting an amount of electric current using a PWM (Pulse Width Modulation) control.

Detection signals of sensors are input to the control device 3. The sensors include a steering angle sensor 300 for detecting the rotation of the steering shaft 120a connected to the steering wheel 120, an engine rotational speed sensor 301 for detecting the rotational speed (the number of revolutions per time) of the output shaft 101a of the engine 101, an accelerator opening degree sensor 302 for detecting an accelerator opening degree (an amount of acceleration operation) depending on an amount of depression of the accelerator pedal 121, a clutch pedal position sensor 303 for detecting the position of the clutch pedal depending on the amount of depression (the amount of clutch operation) of the clutch pedal 123, and a shift position sensor 304 for detecting the position of the shift lever 124.

Furthermore, detection signals of vehicle wheel speed sensors 305 to 308, which are respectively provided for the left front wheel 104L, the right front wheel 104R, the left rear wheel 105L, and the right rear wheel 105R to detect the rotational speed of the respective wheels, are input to the control device 3.

Furthermore, a detection signal of an outside temperature sensor 309 for detecting outside temperature is input to the control device 3. The outside temperature sensor 309 is arranged, for example, inside a front bumper (not shown) of the four-wheel-drive vehicle 100. Furthermore, detection signals of a longitudinal acceleration sensor 310 for detecting acceleration of the four-wheel-drive vehicle 100 in a longitudinal direction, a transverse acceleration sensor 311 for detecting acceleration in a transverse direction (a vehicle width direction), and a yaw rate sensor 312 for detecting a yaw rate are input to the control device 3.

The detection signals of the respective sensors 300 to 312 may be directly input to the control device 3 via a signal line connected to the sensor main body, and may be input to the control device 3 by communication through an in-vehicle network such as a CAN (controller Area Network).

(Configuration of Driving Force Transmitting Device 2)

The driving force transmitting device 2 includes a cylindrical outer housing 21 with a bottom, which is connected to the propeller shaft 114, a cylindrical inner shaft 22 connected to the pinion gear shaft 115, and a main clutch 23 including a plurality of frictional plates arranged between the inner peripheral surface of the outer housing 21 and the outer peripheral surface of the inner shaft 22. The main clutch 23 is constituted by alternately arranging a plurality of outer clutch plates 23a spline-fitted to the outer hosing 21 in a relatively non-rotatable manner, and a plurality of inner clutch plates 23b spline-fitted to the inner shaft 22 in a relatively non-rotatable manner. Lubricant oil is enclosed between the outer housing 21 and the inner shaft 22.

Furthermore, between the outer housing 21 and the inner shaft 22, an annular electromagnetic coil 24 for generating pressing force axially pressing the main clutch 23, a pilot clutch 25 pressed by the electromagnetic force of the electromagnetic coil 24, and a cam mechanism 26 converting rotational force transmitted via the pilot clutch 25 into an axial thrust force pressing the main clutch 23 are arranged.

Excitation current is supplied from the electric current output circuit 33 of the control device to the electromagnetic coil 24. When excitation current is supplied to the electromagnetic coil 24, rotational force of the outer housing 21 is transmitted to the cam mechanism 26 via the pilot clutch 25 by the electromagnetic force, and thrust force pressing the main clutch 23 is generated by operating the cam mechanism 26. As a result, driving force transmitted from the outer housing 21 to the inner shaft 22 is changed depending on excitation current supplied to the electromagnetic coil 24.

(Operation of Control Device)

The control device 3 controls the amount of transmission of torque of the driving force transmitting device 2 by adjusting the excitation current to be supplied to the electromagnetic coil 24. The control device 3 has a normal control function of calculating a torque value to be transmitted to the rear wheels 105 based on the rotational speed difference between the front wheels and the rear wheels, the output torque of the engine 101, the selected gear stage of the transmission 103, the final reduction ratio in the driving force transmission system 110, the steering angle by the operation of the steering wheel 120 or the like, and supplying the excitation current depending on the calculated torque value to the electromagnetic coil 24 of the driving force transmitting device 2.

Furthermore, the control device 3 has a correction function of correcting the torque value to be transmitted to the left and right rear wheels 105L and 105R so as to reduce the torque value for a predetermined time when the four-wheel-drive vehicle 100 is in a stopped state or in a state where the vehicle speed of the four-wheel-drive vehicle is lower than a predetermined value, the rotational speed of the output shaft 101a of the engine 101 is equal to or greater than a predetermined value, and an increasing speed of the engaging force of the clutch 102 is equal to or greater than a predetermined value. In addition, the state where the vehicle speed of the four-wheel-drive vehicle 100 is lower than the predetermined value, includes the state of a forward movement time and the state of a backward movement time of the four-wheel-drive vehicle 100 or may be one of them. The predetermined value is, for example, speed at the time of slow running (crawl).

(Normal Control Function)

The controller 32 of the control device 3 calculates the command torque tc by sum of a first torque t1 based on the rotation speed difference between the front wheels 104 and the rear wheels 105, a second torque t2 based on the output torque of the engine 101 and the selected gear stage of the transmission 103 or the like, and a third torque t3 based on the steering angle.

In the calculation of the first torque t1, a rotational speed Vf (an average rotational speed of the left and right front wheels 104L and 104R) of the front wheels 104 is calculated based on the detection signals of the vehicle wheel speed sensors 305 and 306 respectively provided for the left and right front wheels 104L and 104R, and a rotational speed Vr (an average rotational speed of the left and right rear wheels 105L and 105R) of the rear wheels 105 is calculated based on the detection signals of the vehicle wheel speed sensors 307 and 308 respectively provided for the left and right rear wheels 105L and 105R. Moreover, a rotational speed difference $\Delta V$ ($\Delta V = Vf - Vr$) of the front and rear wheels is obtained by subtracting the rotational speed Vr of the rear wheels 105 from the rotational speed Vf of the front wheels 104.

Moreover, the first torque t1 is obtained with reference to a first torque map, stored in the storage 31, showing a relationship between the rotational speed difference ΔV and the first torque t1. The first torque map is set so that the greater the rotational speed difference ΔV, the greater the first torque t1. As a result, for example, when a slip occurs in the left front wheel 104L or the right front wheel 104R, it is possible to distribute a larger proportion of the driving force of the engine 101 to the rear wheels 105 to suppress the slip. In addition, the first torque t1 may be changed by the vehicle speed S.

In the calculation of the second torque t2, the second torque t2 is obtained with reference to a second torque map showing a relationship between the second torque t2 and the sum (the driving torque) of torque transmitted to the left and right front wheels 104L and 104R and the left and right rear wheels 105L and 105R. The driving torque can be obtained by the calculation, for example, based on the output torque of the engine 101, the selected gear stage of the transmission 103, and the final reduction ratio in the driving force transmission system 110.

The second torque map is set so that, when the driving torque is less than a predetermined value, the second torque t2 is increased depending on an increase of the driving torque or a constant value, and when the driving torque is equal to or greater than the predetermined value, the second torque t2 is increased depending on an increase of the driving torque by an increasing ratio greater than that in a case where the driving torque is less than the predetermined value. The predetermined value is a value that is set depending on a grip limit torque of the left and right front wheels 104L and 104R.

As a result, for example, the great driving force of the engine 101 at the time of the sudden acceleration is uniformly distributed to the front wheels 104 and the rear wheels 105, and thus it is possible to avoid the slip of the left front wheel 104L or the right front wheel 104R that can occur when the driving force is concentrated on the left and right front wheels 104L and 104R serving as the main drive wheels. In addition, the second torque t2 may be changed by the vehicle speed S.

In the calculation of the third torque t3, the steering angle of the steering shaft 120a from the detection signal of the steering angle sensor 300 is detected, and the third torque t3 is obtained with reference to a third torque map, stored in the storage 31, showing a relationship between the steering angle and the third torque t3. The third torque map is set so that, the greater the steering angle is, the greater the third torque t3 is.

As a result, it is possible to suppress the deterioration of the fuel efficiency by stabilizing the vehicle behavior of the four-wheel-drive vehicle 100 at the time of the rotation with the great steering angle and by reducing the command torque tc to be transmitted to the rear wheels serving as the auxiliary drive wheels at the time of the rotation with the small steering angle and at the time of the straight advancement. In addition, the third torque t3 may be further changed by the vehicle speed S.

The controller 32 of the control device 3 calculates the sum of the first torque t1, the second torque t2, and the third torque t3 to obtain the command torque tc (tc=t1+t2+t3). In addition, any one or a combination of some of the first torque t1, the second torque t2, and the third torque t3 may be the command torque tc.

(Correction Function)

The control device 3 has a correction function of correcting the command torque tc obtained as described above based on an amount of operation of the clutch pedal 123 detected by the clutch pedal position sensor 303. In the correction function of the present embodiment, when the vehicle speed S calculated based on the detection signals of the vehicle wheel speed sensors 305 to 308 is less than a predetermined value (hereinafter, the predetermined value is referred to as a "threshold value $SH_S$"), the rotational speed R of the output shaft 101a of the engine 101 calculated based on the detection signal of the engine rotational speed sensor 301 is equal to or greater than a predetermined value (hereinafter, the predetermined value is referred to as a "threshold value $SH_R$"), and an increasing speed of the engaging force of the clutch 102 calculated based on the detection signal of the clutch pedal position sensor 303 is equal to or greater than a predetermined value, the command torque tc calculated based on the rotational speed difference ΔV of the front and rear wheels and an accelerator opening degree φ is reduced by the normal control function.

The threshold $SH_S$ can be set, for example, at 1 to 5 km per hour. In addition, the vehicle speed S of the four-wheel-drive vehicle 100 can be obtained based on the rotational speed Vf of the front wheels 104 calculated based on the detection signals of the vehicle wheel speed sensors 305 and 306 or the rotational speed Vr of the rear wheels 105 calculated based on the detection signals of the vehicle wheel sensors 307 and 308, and in addition, the vehicle speed S may be assumed based on the detection signal of the front and rear acceleration sensor 310.

In a case where the clutch 102 is rapidly engaged when the output shaft 101a of the engine 101 in the four-wheel drive state is rotated at a rotation speed, excessive torque is transmitted to a driving force transmitting member transmitting the driving force of the engine 101 to the rear wheels 105, and the threshold value $SH_R$ is set to be smaller than the rotational speed in which reliable secure of the driving force transmitting member is not performed. The threshold $SH_R$ can be, for example, set to be equal to or greater than 2000 r/min.

Furthermore, in the present embodiment, when the time when the position of the clutch pedal 123 calculated based on the detection signal of the clutch pedal position sensor 303 is moved from a first position to a second position is equal to or less than a predetermined value (hereinafter, the predetermined value is referred to as a "movement time $T_1$"), it is determined that the increasing speed of the engaging force of the clutch 102 is equal to or greater than the predetermined value. Herein, the second position is a position in which the engaging force of the clutch 102 is greater than that in the first position. That is, the first position is a position in which the clutch pedal 123 is greatly depressed further than the second position. Furthermore, the movement time $T_1$ is a time corresponding to the time when the position of the clutch pedal 123 is moved from the first position to the second position in a case where the driver intends to perform the sudden start and operates the clutch pedal 123, and the movement time $T_1$ can be set, for example, to be equal to or less than 0.2 seconds.

Figure 2A:
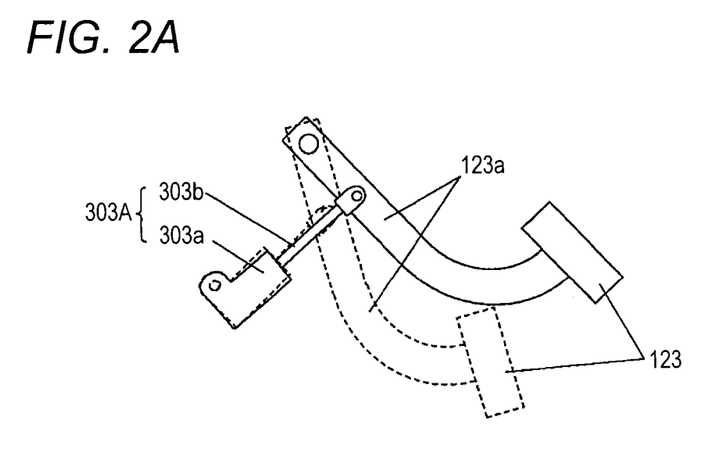
FIG. 2A is an explanatory diagram of a case of using a linear scale.
Figure 2B:
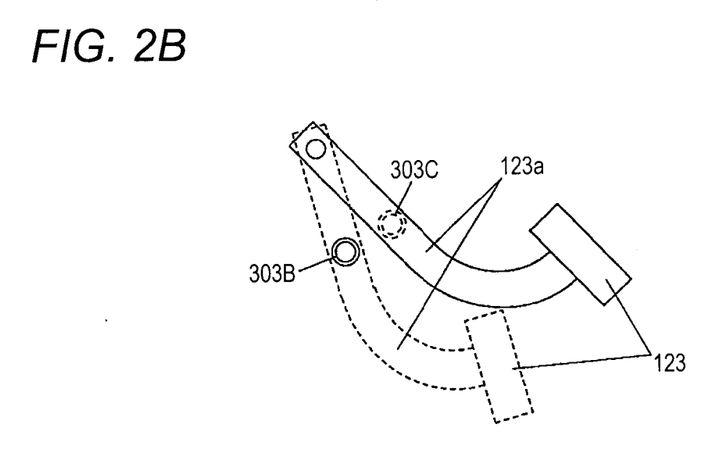
FIG. 2B is an explanatory diagram of a case of using proximity switches.

FIGS. 2A and 2B illustrate configuration examples of the clutch pedal position sensor 303 for detecting the position of the clutch pedal 123, FIG. 2A is an explanatory diagram that describes a configuration example of a case of using a linear scale 303A, and FIG. 2B is an explanatory diagram that describes a configuration example of a case of using a first proximity switch 303B and a second proximity switch 303C. In FIGS. 2A and 2B, the clutch pedal 123 and a clutch lever 123a connected to the clutch pedal 123 are shown by a broken line when the clutch pedal 123 is in the first position, and the clutch pedal 123 and the clutch lever 123a are shown by a solid line when the clutch pedal 123 is in the second position.

In the example shown in FIG. 2A, the linear scale 303A includes a main body 303a, and a movable shaft 303b axially movable with respect to the main body 303a, and an end of the movable shaft 303b is swingably connected to the clutch lever 123a. The main body 303a is supported on a vehicle body (not shown).

When the clutch pedal 123 is moved by the depressing operation of the driver, the movable shaft 303b is axially moved with respect to the main body 303a, and the main body 303a outputs a detection signal depending on an amount of movement of the movable shaft 303b. The control device 3 is capable of continuously detecting the position of the clutch pedal 123 based on the detection signal.

In the example shown in FIG. 2B, when the clutch pedal 123 is in the first position, the first proximity switch 303B is disposed in a position facing the clutch lever 123a, and when the clutch pedal 123 is in the second position, the second proximity switch 303C is disposed in a position facing the clutch lever 123a.

The first proximity switch 303B outputs an on signal when the clutch pedal 123 is in the first position, and the second proximity switch 303C outputs anon signal when the clutch pedal 123 is in the second position. As a result, the control device 3 is capable of detecting that the clutch pedal 123 is in the first position or the second position.

When the control device 3 determines that the vehicle speed S is lower than the threshold value $SH_S$, the rotational speed R of the output shaft 101a of the engine 101 is equal to or greater than the threshold value $SH_R$, and the time when the position of the clutch pedal 123 is moved from the first position to the second position is equal to or less than the predetermined value, the control device 3 corrects the command torque tc so as to reduce the command torque tc for a predetermined time (hereinafter, the predetermined time is referred to as a "command torque reduction time $T_2$"), and supplies electric current depending on the corrected command torque tc to the electromagnetic coil 24 of the driving force transmitting device 2 as the excitation current.

In this correction, the corrected command torque tc may be a product in which the command torque tc is multiplied by a coefficient $k_1$ less than 1 (Command torque tc after correction=Command torque tc before correction×Coefficient $k_1$ ($0<k_1<1$), or may be replaced with a predetermined torque value. In a case where the command torque tc is multiplied by the coefficient $k_1$ to obtain the corrected command torque tc, the coefficient $k_1$ is, for example, equal to or less than 0.8, and more preferably, equal to or less than 0.5. Furthermore, in a case where the command torque tc is replaced with the predetermined torque value to obtain the corrected command torque tc, the predetermined torque value is, for example, equal to or less than 80% of a maximum torque transmission capacity of the driving force transmitting device 2, and more preferably, equal to or less than 50% thereof.

Furthermore, the command torque reduction time $T_2$ is set to a time equal to or greater than the time required for transmitting torque of the engine 101 to the front wheel 104 and lowering the rotational speed R of the output shaft 101a, when the clutch 102 is rapidly engaged in a state where the rotational speed R of the output shaft 101a is higher than the threshold value $SH_R$. The command torque reduction time $T_2$ can be set to be, for example, 0.2 to 5 seconds.

Moreover, in the control device 3, the controller 32 controls the electric current output circuit 33 and supplies electric current depending on the corrected command torque tc to the electromagnetic coil 24 of the driving force transmitting device 2 as the excitation current.

(Processing Sequence of Control Device)

Figure 3:
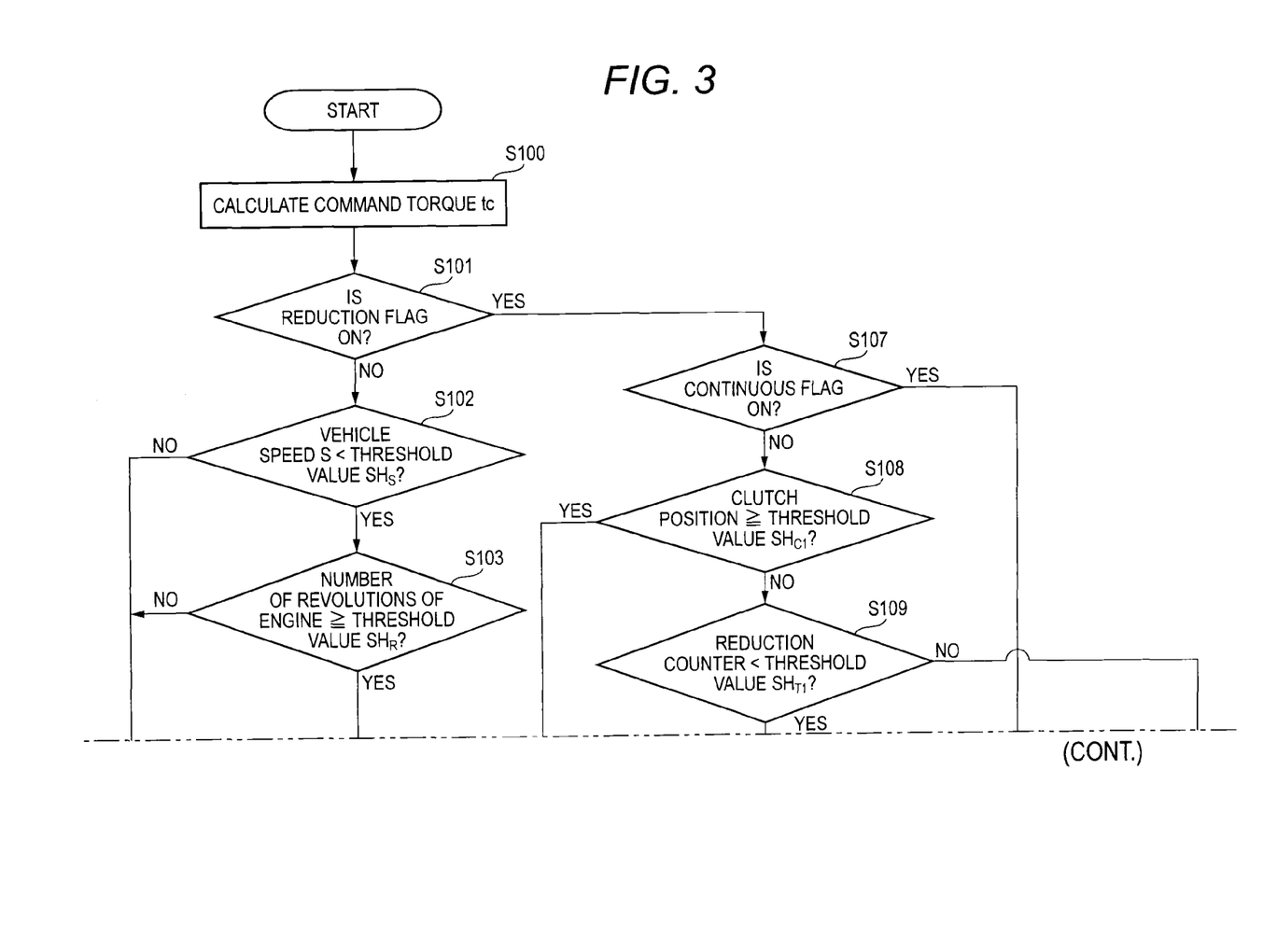
FIG. 3 is a flowchart that shows an example of processing carried out by a controller of a control device.

FIG. 3 is a flow chart that shows an example of processing carried out by the controller 32 of the control device 3. The controller 32 repeatedly carries out the processing shown in the flow chart for each predetermined control cycle (for example, 100 ms). For example, in the flow chart, a case will be described where the position of the clutch pedal 123 is detected by the linear scale 303A shown in FIG. 2A.

Firstly, the controller 32 calculates the first torque t1 depending on the rotation speed difference ΔV with reference to the first torque map by the above-described normal control function, calculates the second torque t2 depending on the drive torque with reference to the second torque map, and calculates the third torque t3 depending on the steering angle with reference to the third torque map. Furthermore, the controller 32 obtains the command torque tc by adding the second torque t2 and the third torque t3 to the first torque t1 (step S100).

Next, the controller 32 determines whether or not a reduction flag is on (step S101). The reduction flag is a flag that indicates that a state where the vehicle speed is low, the number of revolutions of the engine is large, and the clutch pedal 123 is depressed, is detected. When the reduction flag is not on (S101: No), the control device 32 determines whether or not the vehicle speed S is lower than the threshold value $SH_S$ (step S102). When the vehicle speed S is lower than the threshold value $SH_S$ (S102: Yes), the controller 32 determines whether or not the rotational speed R of the output shaft 101a of the engine 101 (the number of revolutions of the engine) is equal to or greater than the threshold value $SH_R$ (step S103).

When the number of revolutions of the engine is equal to or greater than the threshold value $SH_R$ (S103: Yes), the controller 32 determines whether or not the position of the clutch pedal 123 calculated based on the detection signal of the clutch pedal position sensor 303 (303A) is equal to or greater than a first threshold value $SH_{C1}$ (step S104). Herein, the first threshold value $SH_{C1}$ is a value corresponding to the first position of the clutch pedal 123. Furthermore, the position of the clutch pedal 123 indicates an amount of depression of the clutch pedal 123 by the driver, and has a value which is great in the depressed state (a state where the clutch 102 is nearly opened) and is small when the amount of depression is small.

When the position of the clutch pedal 123 is equal to or greater than the first threshold value $SH_{C1}$ (S104: Yes), the controller 32 makes the reduction flag on (step S105), and performs correction to reduce the command torque tc calculated at step S100 (step S106).

Meanwhile, when the vehicle speed S is not lower than the threshold value $SH_S$ (S102: No), when the number of revolutions of the engine is not equal to or greater than the threshold value $SH_R$ (S103: No), or when the position of the clutch pedal 123 is not equal to or greater than the first threshold value $SH_{C1}$ (S104: No), the controller 32 finishes the processing without performing the correction to reduce the command torque tc calculated at step S100.

When determining that the reduction flag is on at step S101 (S101: Yes), the controller 32 determines whether or not a continuous flag is on (step S107). The continuous flag is a flag that indicates whether or not the processing of correcting the command torque tc after the sudden start is continuously performed.

When the continuous flag is not on (S107: No), the controller 32 determines whether or not the position of the clutch pedal 123 calculated based on the detection signal of the clutch pedal position sensor 303 (303A) is equal to or greater than the first threshold value $SH_{C1}$ (step S108).

When the position of the clutch pedal 123 is equal to or greater than the first threshold value $SH_{C1}$ (S108: Yes), the controller 32 performs the correction to reduce the command torque tc calculated at step S100 (step S106). Furthermore, when the position of the clutch pedal 123 is not equal to or greater than the first threshold value $SH_{C1}$ (S108: No), the controller 32 determines whether or not a reduction counter is less than a threshold value $SH_{T1}$ (step S109). Herein, the threshold value $SH_{T1}$ is a value set in accordance with the movement time $T_1$, and for example, when the control cycle is 100 ms, the threshold value $SH_{T1}$=the movement time $T_1$ (second)×10.

When the reduction counter is less than the threshold value $SH_{T1}$ (S109: Yes), the controller 32 increments the reduction counter (step S110), and determines whether or not the position of the clutch pedal 123 is less than a second threshold value $SH_{C2}$ (step S111). Herein, the second threshold value $SH_{C2}$ is a value corresponding to the second position of the clutch pedal 123. When the position of the clutch pedal 123 is less than the second threshold value $SH_{C2}$ (S111: Yes), the controller 32 makes the continuous flag on and clears the reduction counter (step S112), and performs the correction to reduce the command torque tc calculated at step S100 (step S106).

When the position of the clutch pedal 123 is less than the second threshold value $SH_{C2}$ (step S111: No), the controller 32 performs the correction to reduce the command torque tc calculated at step S100 without making the continuous flag on (step S106).

Meanwhile, when determining, at step S109, that the reduction counter is not less than the threshold value $SH_{T1}$ (S109: No), the controller 32 clears the reduction counter and clears the reduction flag (step S113), and the controller 32 finishes the processing without performing the correction to reduce the command torque tc calculated at step S100.

When determining, at step S107, that the continuous flag is on (S107: Yes), the controller 32 determines whether or not the continuous counter is less than a threshold value $SH_{T2}$ (step S114). Herein, the threshold value $SH_{T2}$ is a value set in accordance with the command torque reduction time $T_2$, and for example, when the control cycle is 100 ms, the threshold value $SH_{T2}$=command torque reduction time $T_2$ (second)×10.

When the continuous counter is less than the threshold value $SH_{T2}$ (S114: Yes), the controller 32 increments the continuous counter (step S115), and performs the correction to reduce the command torque tc calculated at step S100 (step S106). In this manner, after the clutch position is less than the second threshold value $SH_{T2}$, until the continuous counter is equal to or greater than the threshold value $SH_{T2}$, the correction of reducing the command torque tc is continuously performed.

Meanwhile, when the continuous counter is not less than the threshold value $SH_{T2}$ (S114: No), the controller 32 clears the continuous flag, the reduction flag and the continuous counter (step S116), and finishes the processing without performing the correction to reduce the command torque tc calculated at step S100.

In addition, in a case where the position of the clutch pedal 123 is detected by the first proximity switch 303B and the second proximity switch 303C shown in FIG. 2B, the processing of step S105 (the reduction flag on) may be performed when the detection signal of the first proximity switch 303B is on, and the processing of step S112 (the continuous flag on) may be performed when the detection signal of the second proximity switch 303C is on.

Function and Effect of First Embodiment

According to the first embodiment mentioned above, the position of the clutch pedal 123 is moved from the first position to the second position, and when it is detected that the time required for the movement is equal to or less than the movement time $T_1$, after that, the command torque tc is reduced for the torque reduction time $T_2$. That is, in a case where an operation of rapidly engaging the clutch pedal 123 is performed, compared to a case where the operation is not performed, the torque transmitted to the rear wheels 105 is reduced for a predetermined time. As a result, even at the time of sudden start in the state where the number of revolutions of the engine 101 is great, it is possible to suppress that the excessive burden is applied to the driving force transmitting member transmitting the driving force of the engine 101 to the rear wheels 105. Furthermore, compared to a case of not considering the increasing speed of the engaging force of the clutch 102, that is, the changing amount (the movement speed) per time of the position of the clutch pedal 123, it is possible to more suitably detect the sudden start of the four-wheel-drive vehicle 100.

Second Embodiment

Figure 4:
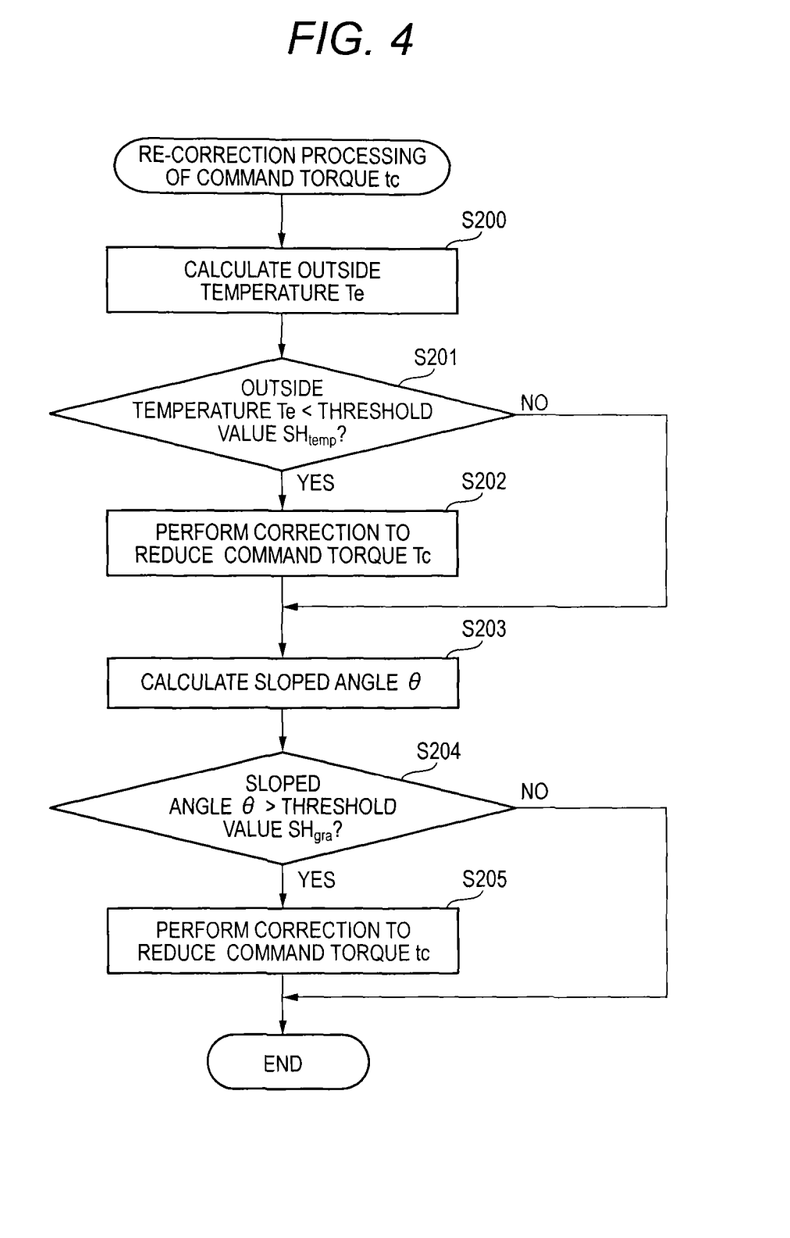
FIG. 4 is a flow chart that shows an example processing carried out by a controller of a control device according to a second embodiment of the present invention.

Next, a second embodiment of the present invention will be described with reference to FIG. 4. The present embodiment is common to the first embodiment except for performing the re-correction processing to reduce the command torque tc after performing the processing to correct the command torque tc of step S106 of the flow chart shown in FIG. 3. FIG. 4 shows an example of the processing content in the re-correction processing.

In the re-correction processing, the controller 32 increases a reduction amount for reducing the command torque tc depending on the decrease in outside temperature detected by the outside temperature sensor 309, and the controller 32 increases the reduction amount for reducing the command torque tc when the traveling direction of the four-wheel-drive vehicle 100 on the road is an upward gradient.

More specifically, the controller 32 calculates the outside temperature Te based on the detection signal of the outside temperature sensor 309 (step S200). Next, the controller 32 determines whether or not the outside temperature Te calculated in step S200 is lower than a threshold value $SH_{temp}$ (step S201). The threshold value $SH_{temp}$ is a temperature at which torque that is equal to or greater than torque corresponding to the excitation current supplied to the electromagnetic coil 24 is transmitted to the rear wheels 105 by the increase in viscosity of lubricant oil filled in a space between the outer housing 21 and the inner shaft 22 of the driving force transmitting device 2. The threshold value $SH_{temp}$ is set to, for example, 0° C.

As a consequence of the determination, when the outside temperature Te is lower than the threshold value $SH_{temp}$, the correction of further reducing the command torque tc having been corrected at step S106 is performed (step S202).

In the processing of step S202, for example, the product in which the command torque tc having been corrected at step S110 is multiplied by a coefficient $k_2$ less than 1 is the re-corrected command torque tc, or the command torque tc is replaced with a predetermined torque value. In this case, the coefficient $k_2$ may be, for example, 0.5 to 0.8. The predetermined torque value may be, for example, equal to or less than 50% of the maximum torque transmission capacity of the driving force transmitting device 2, and more preferably, equal to or less than 30% thereof.

Next, the controller 32 calculates a sloped angle θ of the longitudinal direction of the four-wheel-drive device 100 based on the detection signal of the longitudinal acceleration sensor 310 (step S203). Herein, the sloped angle θ is a positive value when the position of the front wheels 104 is higher than the position of the rear wheels 105 in the vertical direction. In addition, since the processing of step S203 is carried out when the vehicle speed S is determined to be lower than the threshold value $SH_S$ in the processing of step S102 (see FIG. 3). Thus, the detection signal of the longitudinal acceleration sensor 310 in step S203 is a value corresponding to the sloped angle θ of the longitudinal direction of the four-wheel-drive vehicle 100.

Next, the controller 32 determines whether or not the sloped angle θ calculated at step S203 is greater than a threshold value $SH_{gra}$ (step S204). The threshold value $SH_{gra}$ is, for example, set to a value equal to or greater than 5°. As a consequence of the determination, when the sloped angle θ is greater than threshold value $SH_{gra}$ (S204: Yes), the correction of further reducing the command torque tc having been corrected at least one of at step S106 and at step S202 is performed (step S205).

In the processing of step S205, for example, the product in which the command torque tc having been corrected at least one of at step S106 and at step S202 is multiplied by a coefficient $k_3$ less than 1 is the re-corrected command torque tc, or the command torque tc is replaced with a predetermined torque. In this case, the coefficient $k_3$ may be, for example, 0.5 to 0.8. The predetermined torque value may be, for example, equal to or less than 50% of the maximum torque transmission capacity of the driving force transmitting device 2, and more preferably, equal to or less than 30% thereof.

Function and Effect of Second Embodiment

Since the correction of further reducing the command torque tc is performed when the outside temperature Te is lower than the threshold value $SH_{temp}$, it is possible to suppress that excessive torque is transmitted to the rear wheels 105 by the increase in viscosity of lubricant oil filled in a space between the outer housing 21 and the inner shaft 22 of the driving force transmitting device 2.

Furthermore, since the correction of further reducing the command torque tc is performed when the sloped angle θ of the longitudinal direction of the four-wheel-drive vehicle 100 is greater than the threshold value $SH_{gra}$, it is possible to suppress that excessive torque is transmitted to the driving force transmitting member transmitting the driving force of the engine 101 to the rear wheels 105 in a case where load is applied to the rear wheels 105, slip is easily occurred in the front wheels 104, and great torque is easily transmitted to the rear wheels 105. Particularly, when performing a so-called hill start, in many cases, the operation of engaging the clutch 102 is performed in the state where the number of revolutions of the engine 101 is increased in advance, and even in such a case, it is possible to suitably secure the driving force transmitting member on the side of the rear wheels 105.

Another Embodiment

Although the driving force distribution device and the four-wheel-drive vehicle of the present invention have been described based on the embodiments mentioned above, the present invention is not limited to the embodiments mentioned above but can be carried out in various forms without departing from the gist thereof.

For example, in the respective embodiments mentioned above, when the time when the position of the clutch pedal 123 is moved from the first position to the second position is equal to or less than the predetermined value, it is determined that the increasing speed of the engaging force of the clutch 102 is equal to or greater than the predetermined value. However, without being limited thereto, pressing force of the pressing mechanism bringing the first disk 102a and the second disk 102b of the clutch 102 into pressure-contact with each other is detected, and based on the changing amount of the pressing force per time, it may be determined whether or not the increasing speed of the engaging force of the clutch 102 is equal to or greater than the predetermined value.

Furthermore, in addition to the respective embodiments mentioned above, the vehicle weight is assumed or detected based on the vehicle speed and the number of revolutions of the engine, and the command torque may be corrected depending on the assumed vehicle weight or the detected vehicle weight. For example, the command torque tc may be corrected so as to be small, as the obtained vehicle weight is great. In the second embodiment mentioned above, the product in which the command torque tc having been re-corrected at step S205 is multiplied by a coefficient $k_4$ having the small value as much as the vehicle weight is increased (weighed), may be the re-re-corrected command torque tc. Otherwise, it is determined whether or not the obtained vehicle weight is greater than a threshold value. As a consequence of the determination, when the vehicle weight is greater (heavier) than the threshold value, the correction of further reducing the command torque tc is performed. In the second embodiment mentioned above, the product in which the command torque tc having been re-corrected at step S205 is multiplied by a coefficient $k_5$ less than 1 may be the re-re-corrected command torque tc, or the command torque tc may be replaced with a predetermined torque value.

Furthermore, in the respective embodiments mentioned above, a case has been described where the front wheels 104 are the main drive wheels and the rear wheels 105 are the auxiliary drive wheels. However, it is also possible to apply the present invention to a four-wheel-drive vehicle in which the front wheels 104 are the auxiliary drive wheels and the rear wheels 105 are the main drive wheel, without being limited thereto.

According to an aspect of the invention, it is possible to more suitably detect the sudden start state of the vehicle.

What is claimed is:

1. A driving force distribution control device which is mounted on a four-wheel-drive vehicle including an engine configured to generate driving force for the vehicle, a transmission device configured to shift rotation of an output shaft of the engine, a clutch configured to engage the output shaft of the engine with an input shaft of the transmission device, and a driving force transmission system capable of transmitting output of the transmission device to main drive wheels which are one of front wheels and rear wheels and auxiliary drive wheels which are the other of the front wheels and the rear wheels, the driving force distribution control device comprising:

a control device configured to obtain a torque value to be transmitted to the auxiliary drive wheels, and a driving force transmitting device configured to transmit torque depending on the torque value obtained by the control device to the auxiliary drive wheels, wherein the control device reduces the torque value for a predetermined time when the vehicle is in a stopped state and an increasing speed of engaging force of the clutch is greater than or equal to a predetermined increasing speed value, and wherein the control device reduces the torque value for the predetermined time when the vehicle is in a state where a vehicle speed of the vehicle is lower than a predetermined vehicle speed value and the increasing speed of engaging force of the clutch is greater than or equal to the predetermined increasing speed value.

2. The driving force distribution control device according to claim 1, wherein the control device reduces the torque value for the predetermined time when the vehicle is in the stopped state, the increasing speed of the engaging force of the clutch is greater than or equal to the predetermined increasing speed value, and a rotational speed of the output shaft of the engine is greater than or equal to a predetermined rotational speed value, and wherein the control device reduces the torque value for the predetermined time when the vehicle is in the state where the vehicle speed of the vehicle is lower than the predetermined value, the increasing speed of the engaging force of the clutch is greater than or equal to the predetermined increasing speed value, and the rotational speed of the output shaft of the engine is greater than or equal to the predetermined rotational speed value.

3. The driving force distribution control device according to claim 1, wherein the control device determines that the increasing speed of the engaging force of the clutch is equal to or greater than the predetermined increasing speed value when a position of a clutch pedal is moved from a first position to a second position in an amount of time equal to or less than a predetermined movement time.

4. The driving force distribution control device according to claim 1, wherein the control device increases an amount of reduction in the torque value when an outside temperature is below a threshold temperature.

5. The driving force distribution control device according to claim 1, wherein the control device increases an amount of reduction in the torque value when a traveling direction of the vehicle has an upward gradient.

6. A four-wheel-drive vehicle comprising: an engine configured to generate driving force for the vehicle; a transmission device configured to shift rotation of an output shaft of the engine;

a clutch configured to engage the output shaft of the engine with an input shaft of the transmission device;

a driving force transmission system capable of transmitting the output of the transmission device to main drive wheels which are one of front wheels and rear wheels and auxiliary drive wheels which are the other of the front wheels and the rear wheels;

a control device configured to obtain a torque value to be transmitted to the auxiliary drive wheels; and a driving force transmitting device configured to transmit torque depending on the torque value obtained by the control device to the auxiliary drive wheels, wherein the control device reduces the torque value for a predetermined time when the vehicle is in a stopped state and an increasing speed of engaging force of the clutch is greater than or equal to a predetermined increasing speed value, and wherein the control device reduces the torque value for the predetermined time when the vehicle is in a state where a vehicle speed of the vehicle is lower than a predetermined vehicle speed value and the increasing speed of engaging force of the clutch is greater than or equal to the predetermined increasing speed value.

7. The four-wheel-drive vehicle according to claim 6, wherein the increasing speed of the engaging force of the clutch is greater than or equal to the predetermined increasing speed value when a position of a clutch pedal is moved from a first position to a second position in less than or equal to a predetermined movement time.

8. A four-wheel-drive vehicle comprising: an engine configured to generate driving force for the vehicle; a transmission device configured to shift rotation of an output shaft of the engine;

a clutch configured to engage the output shaft of the engine with an input shaft of the transmission device;

a driving force transmission system configured to transmit the output of the transmission device to main drive wheels which are one of front wheels and rear wheels and auxiliary drive wheels which are the other of the front wheels and the rear wheels;

a control device configured to obtain a torque value to be transmitted to the auxiliary drive wheels; and a driving force transmitting device to transmit torque depending on the torque value obtained by the control device to the auxiliary drive wheels, wherein the control device reduces the torque value for a predetermined time when the vehicle is in a stopped state, an increasing speed of the engaging force of the clutch is greater than or equal to a predetermined increasing speed value, and a rotational speed of the output shaft of the engine is greater than or equal to a predetermined rotational speed value, and wherein the control device reduces the torque value for the predetermined time when the vehicle is in a state where a vehicle speed of the vehicle is lower than a predetermined vehicle speed value, the increasing speed of the engaging force of the clutch is greater than or equal to the predetermined increasing speed value, and the rotational speed of the output shaft of the engine is greater than or equal to the predetermined rotational speed value.

* * * * *